Jan. 19, 1926.

H. SYVERTSEN 1,570,536

GATE STOP FOR TURBINE CONSTRUCTION

Filed Feb. 20, 1925    2 Sheets-Sheet 1

Inventor
Harald Syvertsen
By
Attorney

Jan. 19, 1926.
H. SYVERTSEN
1,570,536
GATE STOP FOR TURBINE CONSTRUCTION
Filed Feb. 20, 1925      2 Sheets-Sheet 2
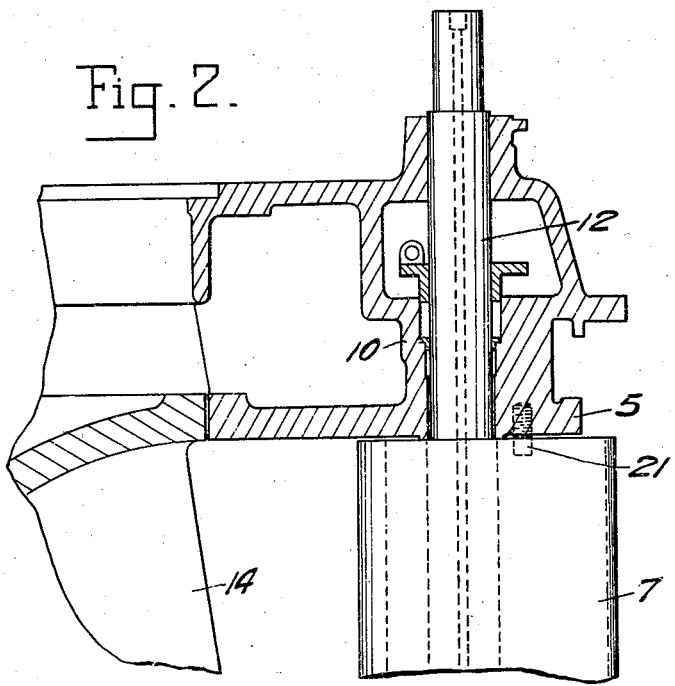
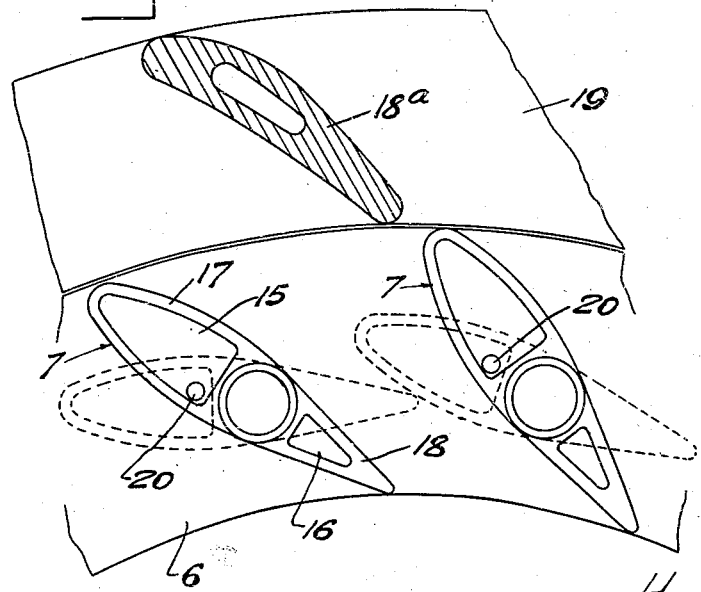
Inventor
Harald Syvertsen
By
Attorney Patented Jan. 19, 1926.

1,570,536

UNITED STATES PATENT OFFICE.

HARALD SYVERSTEN, OF YORK, PENNSYLVANIA, ASSIGNOR TO S. MORGAN SMITH COMPANY, OF YORK, PENNSYLVANIA, A CORPORATION OF PENNSYLVANIA.

GATE STOP FOR TURBINE CONSTRUCTION.

Application filed February 20, 1925. Serial No. 10,619.

*To all whom it may concern:*

Be it known that I, HARALD SYVERTSEN, a citizen of the United States, residing at York, in the county of York and State of Pennsylvania, have invented new and useful Improvements in Gate Stops for Turbine Construction, of which the following is a specification.

The present invention relates to stop means for the gates of turbine installations and is adapted to be applied either to the bottom or top plate adjacent the runner or wheel of the turbine.

The primary object of the invention is to provide a gate stop which is disposed in such position, or projects either from the bottom or top plate of a turbine installation, as to come within the cored opening of each gate and prevent the gate from swinging around its stem and coming into contact with the runner buckets in the event of breakage of the connections between the gates and the operating means therefor.

A further object of the invention is to dispose the improved gate stop means within the cored openings of the gates, so that in any position of the latter and at all times the said stop means is out of, or does not in the least interfere with, the clear water passages formed between the gates when the latter are open to supply the runner, and thereby avoid the formation of any obstruction to the flow of the water, however slight, between the gates, and also eliminate any projection in the water passages that might have a tendency to gather leaves, grass or trash of any kind.

With the foregoing and other objects and advantages in view, the invention consists in the preferred construction and arrangement of the several parts which will be more fully hereinafter described and claimed.

In the drawings:

Fig. 2 is a view similar to Fig. 1 of a portion of the gate and runner organization of a turbine installation, showing the improved stop means secured to and depending from the top plate.

Fig. 3 is a horizontal section through a portion of a turbine installation, showing the gates and a guide vane together with the improved stop means within the gates, the gates being shown in open and closed positions, respectively, in full and dotted lines.

Figure 1:
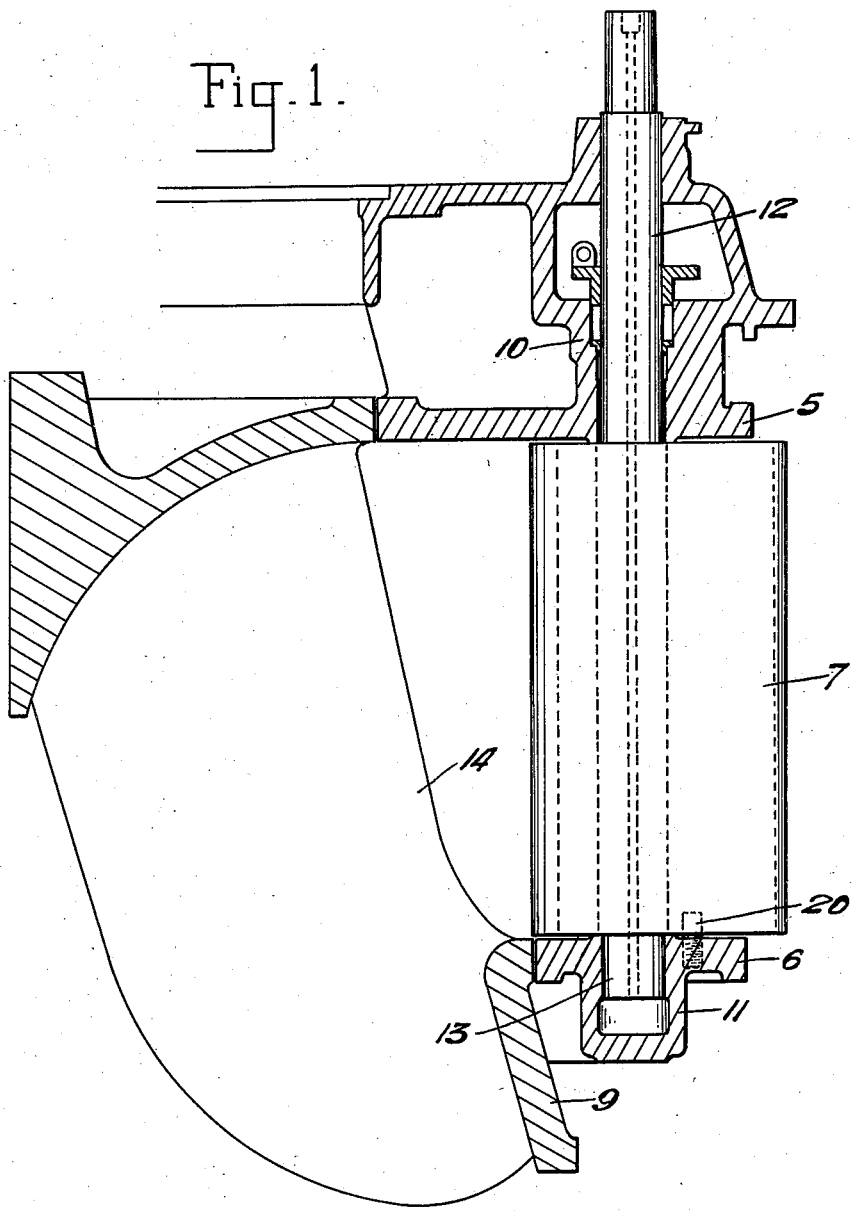
Fig. 1 is a transverse vertical section through approximately one-half of the gate and runner organization of a turbine installation, showing the improved gate stop means applied thereto and connected to and projecting upwardly from the bottom plate.

Only so much of a turbine installation that is necessary to illustrate the practical operation of the features of the present invention has been shown in the accompanying drawings, and therein the numeral 5 designates the top plate, 6 the bottom plate, 7 the gates mounted between the said top and bottom plates, 9 the runner or wheel to which the water supply is controlled by the operation of the gates, and 10 and 11 the bearing organizations respectively associated with the plates 5 and 6 for the upwardly projecting gate stems 12 and the lower journal or pivot members 13. As will be readily understood, the runner 9 has free rotative movement inside of the gates and comprises a plurality of buckets 14. The gates as now commonly constructed are preferably of the shape shown by Fig. 3 and are cored out as at 15 and 16 respectively in the longer and shorter sides 17 and 18. The openings formed by coring out the gates as specified extend fully through the vertical length of the gates, and as shown by Fig. 3, a cored guide vane 18$^a$ is also adapted to be associated with the gates and carried by a part 19 of the frame of the turbine installation. The gate stems 12 project through the bearing organizations 10 for attachment to suitable gate-operating means, but the features of the present invention are not confined to gates operated from their upper extremities, as it may be equally well used with gates controlled by shiftable means cooperating with the lower ends of the gates. All of the features thus far described are well known in the art of turbine installations and form no part of the features of the present invention.

The invention consists, as hereinbefore indicated, of providing stop means to prevent the gates from swinging around their stems beyond a predetermined point and avoid contact of the gates with the buckets of the runner when breakage of the connections for any one or more of the gates may have ensued, thus eliminating possibility of expensive damage to the runner buckets. The means employed to serve as a stop for the gates preferably consists of a pin 20 secured in and projecting upwardly from the inner portion of the bottom plate 6 as shown by Figs. 1 and 3, or depending from the inner portion of the upper plate 5, as at 21, Fig. 2. These pins extend into the openings formed by the cored out longer extremities 17 of the gates, the said pins being disposed at regular distances apart and in accordance with the mounting of the gates and may be very easily applied in operative position at a minimum expense. The pins 20 or 21 respectively projecting upwardly from the lower plate 6 or depending from the top plate 5 are enclosed in the openings formed by the cored out portions 15 of the longer sides or extremities 17 of the gates and are so placed relatively to the movement of the gate that they will prevent either extremity of the gate, and particularly the longer extremity of each gate, from extending inwardly beyond the inner edge of the top or bottom plate and thus avoid contact with the buckets 14 of the runner or wheel. The improved gate stop means is particularly adapted for use with any form of gate having the cored out portions or openings formed therein.

Where gates are protected by means of breakable link connections between the stems or other portions of the gates and operating means such as the gate ring and governor mechanism and when one or more of these breakable links are fractured, thereby releasing an obstructed gate or gates, it is sometimes possible for the gates to swing around their stems so that either the front or rear end is pointing straight inward towards the runner. In general, the outer end of the gate is longer than the front end, and therefore the former end usually swings in towards the runner, and in many types and designs of turbines this outer end of the gate is long enough to strike the runner should it point straight inward, thereby damaging or perhaps smashing the runner entirely. The invention is also equally effective in limiting the movement of gates which are not protected by breakable links and at a time when either the gate lever or gate stem, or whatever means is used to move the gate, becomes broken and leaves the gate free to swing around its center and follow the flow of water in towards the runner. It is therefore to be understood that the improved gate stop means is not limited in its application.

The gates having the improved stop devices associated therewith are free to move fully from closed to open position as required by normal operation, but when the gate connecting mechanism of whatever nature it may be becomes broken and liberates any one of the gates, the stop means in the preferred form as shown and as hereinbefore described strikes the one side wall of the liberated gate as indicated in full lines in Fig. 3, and as a consequence the gate will be held against inward projection into the path of operation of the runner and no damage ensues. In applying the pins 20 or 21, they can be very readily tapped or fastened in the bottom or top plate or in any other available part of the turbine structure and may be of any size, form or material, it being only necessary that the stop pins clear the gate in either the closed or open position and of sufficient strength to prevent the gates from swinging into the runner. Moreover, as hereinbefore indicated, the position of the pins within the cored out portions of the gates leaves the water passages between the gates absolutely free or clear of any obstructing means or projection that might gather and effect an accumulation of leaves, trash or other matter in the water passages.

What is claimed as new is:

1. The combination with a turbine and runner, of gate means mounted to have pivotal swinging operation and provided with an open space therein with opposite wall portions, and stop means secured to a part of the turbine and projecting into the open space of the gate means and concealed within the latter and operative with relation to said wall portions to limit the movement of the gate means in the event of breakage of the operating devices therefor.

2. The combination with a turbine installation including a runner and pivoted gates having an end portion with walls, of stop pin means extending into the gates between the said walls without interfering with the normal opening and closing movements of the latter but preventing abnormal free movement thereof relatively to the runner.

3. The combination with a turbine installation including a runner with buckets and pivotally mounted gates controlling the supply of water to the runner, of stop means extending into and enclosed and concealed within portions of the gates to engage opposite portions of the latter to obstruct abnormal free movement of the gates.

4. The combination with a turbine installation including a runner with buckets, upper and lower plates and pivotally mounted gates controlling the supply of water to the runner and having open portions with opposing walls, of means extending into the open portions of the gates between the said walls at a predetermined distance from the pivotal connections of the latter to obstruct free abnormal movement of the gates and prevent parts of the gates from striking the runner.

5. The combination with a turbine installation including a runner having buckets, upper and lower plates and gates pivotally mounted between the said plates to control the supply of water to the runner, the gates having cored out openings extending therethrough, of stop means secured to one of the plates and loosely projecting into a part of the cored out openings to limit the abnormal free movement of the gates and prevent engagement of parts thereof with the runner.

In testimony whereof I have hereunto set my hand.

HARALD SYVERTSEN.